S. W. ROBINSON.
Telephone.
No. 227,653.  Patented May 18, 1880.
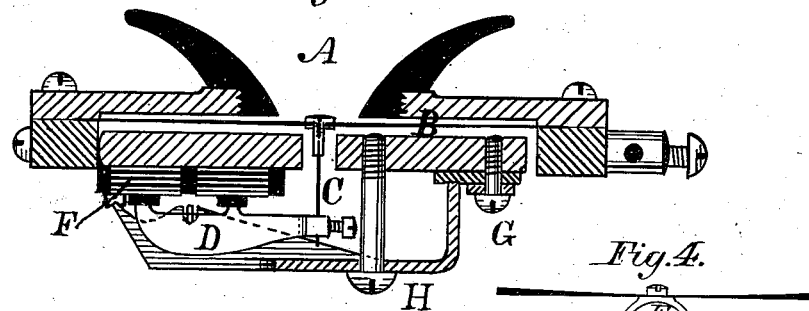
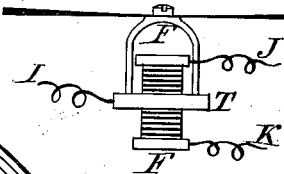
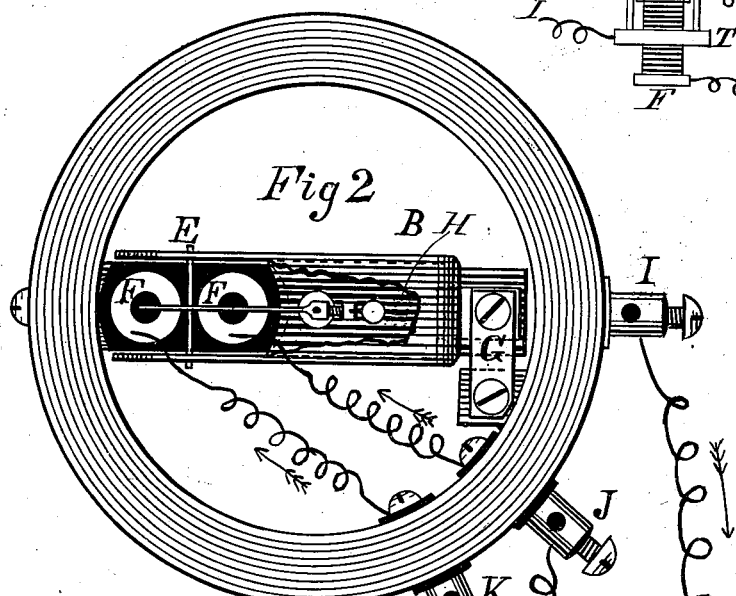
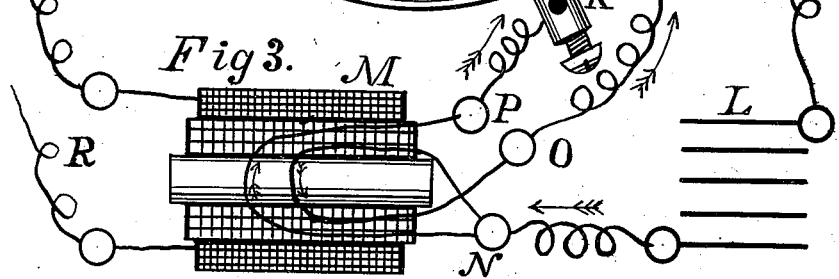
Witnesses.  Inventor.
Stillman W. Robinson

UNITED STATES PATENT OFFICE.

STILLMAN W. ROBINSON, OF COLUMBUS, OHIO.

TELEPHONE.

SPECIFICATION forming part of Letters Patent No. 227,653, dated May 18, 1880.

Application filed August 21, 1879.

*To all whom it may concern:*

Be it known that I, STILLMAN W. ROBINSON, of Columbus, Ohio, have invented a new and useful Improvement in Telephones, of which the following is a specification.

This invention relates, first, to the application of the so-called "divided circuit" to telephones; second, to such connections as lead to simplicity of apparatus; third, to the use of a circular diaphragm of unequal thickness with single central point of action; and, fourth, to the combined action of a lever and divided circuit for intensifying the sounds transmitted.

Of the many semi-conducting materials possible carbon is the one referred to throughout this specification. An induction-coil is also employed for the usual purpose, the primary of which is necessarily double to adapt it to the divided circuit.

As regards the divided circuit, it is well known that when the conducting-connections between the copper and zinc elements of a battery consist of two wires for a part or all of the length, the current will also divide into two parts and continue so to the point of junction of the bifurcated conductor. It is also known that if the parts of the conductor thus bifurcated have in one case equal and in another unequal electrical resistances the relative intensities of the parts of the current will be equal or unequal also. Again, if the relative resistances vary the relative current-intensities vary. These principles of action of the divided circuit I employ in this transmitter, the single battery with current thus divided serving every purpose of two equal batteries arranged, as heretofore done, in two-circuit transmitters, each circuit having its independent battery and connections.

A transmitter incorporating my improvement is shown in the accompanying drawings, in which—

Figure 1 is a meridianal section; Fig. 2, a projection from the rear; Fig. 3, the induction-coil in section; Figs. 2 and 3, the electrical connections, and Fig. 4 a simplified arrangement for the divided circuit.

The vibrations of the diaphragm B are transmitted by the rod C and lever D to the cells F F, containing the carbon, or, as in Fig. 4, more directly by the U-shaped piece and contact-piece T, as shown. The fulcrum of D is at E. This lever has two bearing-points on hard-rubber buttons, the latter being attached to metal disks at F F. These disks form caps to cells of hard rubber, within which cells is placed the semi-conducting carbon. One disk is in direct electrical connection with J and the other with K. The bottoms of these cells are also metal and electrically connected with I. In Fig. 4 these cells are on opposite sides of T, the latter connecting with I.

By these arrangements it is easily understood how a forward movement of B causes increased pressure upon carbon in one cell, decreased in the other, and vice versa for a backward movement, and also how the two parts of the divided circuit from J and K, through these cells of carbon, are made one greater, the other less, and vice versa.

The induction-coil M, with double primary coil, has the parts of its primary so connected in the divided circuit that one part of the latter flows one way and the other part the other way. Hence the alternating actions at F F cause the opposite currents in the primary of M to alternate in intensity, producing corresponding reversed induced currents in the main line.

A few considerations will indicate the manifest advantages of the above divided-circuit arrangement over that which employs two batteries and independent circuits. It is seen, first, that with the divided circuit the single battery it employs gives results which are the full equivalents to those obtained by two equal batteries as connected in two-circuit transmitters. To illustrate: Suppose the pressure to be increased upon one carbon F to the extent that the other carbon is just relieved from pressure; then, with the divided circuit, the one battery exerts all its power through the one carbon and over one part of the primary of M. Conversely, when these conditions of pressure upon F F are reversed the full battery-power acts through the other carbon and the other part of the primary of M; but in the case of two separate batteries and currents, one for each carbon F F, when one carbon is compressed and the other relieved one battery only can act while the other is idle, and in the reverse conditions the other battery only can act. Again, suppose the telephone in equilibrium with light and equal pressures upon the carbons F F. Now, as the principal resistances to currents are at F F, it follows from the laws of electrical science that when both are in the aggregate current of a single battery, as in the divided-circuit system, their aggregate resistance is only half what it would be for a single current of one equal battery through one carbon F. From the law that the current of a battery multiplied by the current resistance is a constant, it follows that the current at a single carbon F is again the same in the case of the divided circuit and single battery as when two equal batteries are used each in single circuit. Therefore, generally, the currents at F F are the same for a single battery in divided circuit as for two batteries, each equal the former and connected in independent circuits. Hence the divided-circuit system leads to the important practical advantage of reducing the number of batteries, the consequent first cost, and care of maintenance about one-half.

Another important gain due to the divided circuit is in simplified connections. This is seen from the fact that the usual arrangement of carbon transmitting apparatus is such that the transmitter and induction-coil are united in one piece attached to a wall, the battery being a few feet or yards distant, connected by two wires.

In my improved divided-circuit system the modifications may be wholly internal to the wall apparatus, the binding-posts, connecting-wires, batteries, &c., for external connections being no different than in the ordinary single-circuit system. Renters of telephones would therefore perceive no increased complication, neither would agents experience additional difficulties in setting up and connecting; but two-circuit and two-battery transmitters would necessitate double the external apparatus and connections, with special precautions as to poling of batteries, &c.

The practical operations of telephone management are therefore much simplified in the divided-circuit system as compared with the two-circuit system.

To improve the telephonic rendering of words, the diaphragm is made of unequal thickness, though still circular in form, and with one point of action or contact at the center. The thickness is so varied that in different concentric circles it differs, while in any one concentric circle it is uniform.

In Fig. 1 the center is thickest, while in Fig. 4 it is thinnest. The former yields mostly at its edges, the stiffer central portion being well adapted for throwing a strong pulse upon the central contact, while the latter is better adapted for taking up the more delicate vibratory movements. In this diaphragm no attempt is made to secure different rates of vibration at different parts, nor to modify the vibrations by stretching the diaphragm in any way. The object is to produce a diaphragm which, as ordinarily held, will avoid certain objectionable sounds, such as hissing, and to bring out certain other qualities, such as volume, fullness of word, character, &c.

The divided-circuit arrangement, it is evident, should largely increase the loudness over that of simple circuit-transmitters, from the fact that the former changes the current-intensity from + to −, while the latter changes it only from + to 0; but, to carry the maximum still higher, I combine the lever D with the divided circuit, as above described, so that the alternations of pressure can be made greater than by the direct action of Fig. 4, and thus the + and − intensities of the divided circuit augmented. It should be understood, however, that the use of the lever is not here claimed broadly, as I am aware that it has been previously employed in transmitters; but I am not aware that it has previously been combined with the divided circuit of a single battery with the object of gaining loudness.

What I claim, and desire to secure by Letters Patent, is—

1. In transmitting-telephones, the divided primary circuit or current, in combination with the induction-coil M, with duplex primary, and the carbons F F, all connected as described, so that a single battery is made to do the work of two, as set forth.

2. The bifurcated electric conductor between I and N, confined to making the circuit of the transmitter and induction-coil only, so that single binding-posts I and N are sufficient for connecting the wall apparatus to a single battery in the ordinary way, as described.

3. The combination, with the carbon or carbons F and connections, as described, of the circular diaphragm B, the thickness of which is so varied that at different concentric circles it differs, while on any one concentric circle it is uniform.

4. The combination of the lever D and the two carbons F with the two branches of the bifurcated conductor of a single battery-circuit, as described, with the object of raising the loudness of the words transmitted to a high maximum.

STILLMAN W. ROBINSON.

Witnesses:
W. A. DUVALL,
EDW. H. THOMAS.